Dec. 13, 1966  W. KOBER  3,292,024
DYNAMOELECTRIC MACHINE
Filed May 16, 1963  3 Sheets-Sheet 1

INVENTOR.
William Kober
BY
Christel & Bean
ATTORNEYS.

Dec. 13, 1966  W. KOBER  3,292,024
DYNAMOELECTRIC MACHINE
Filed May 16, 1963  3 Sheets-Sheet 2
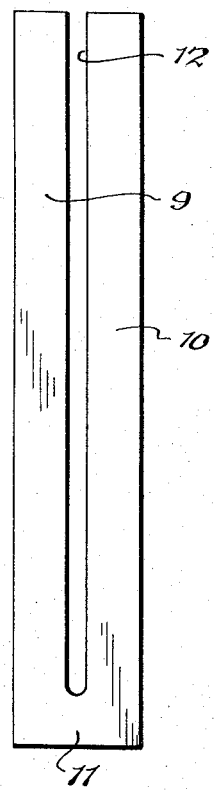
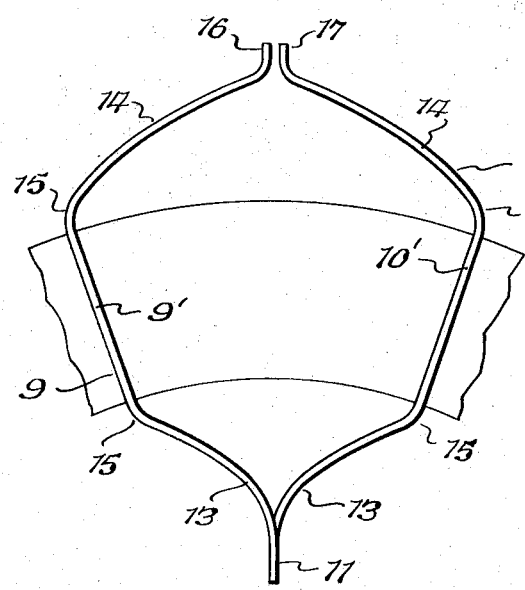
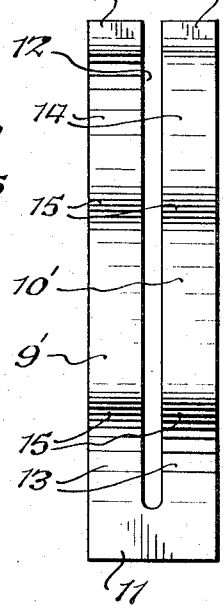
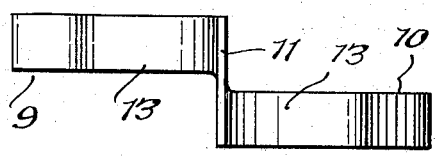
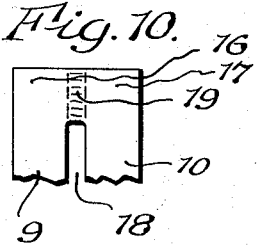
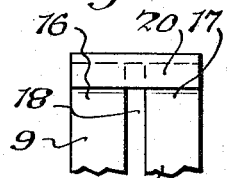
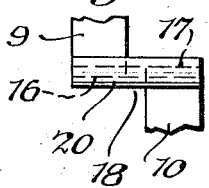
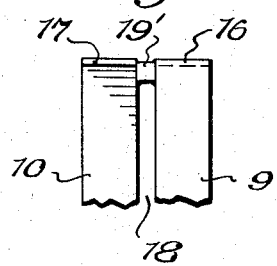
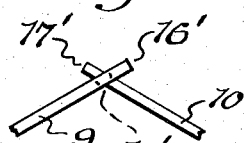
INVENTOR.
William Kober
BY
Christel & Bean
ATTORNEYS.

Dec. 13, 1966  W. KOBER  3,292,024
DYNAMOELECTRIC MACHINE
Filed May 16, 1963  3 Sheets-Sheet 3
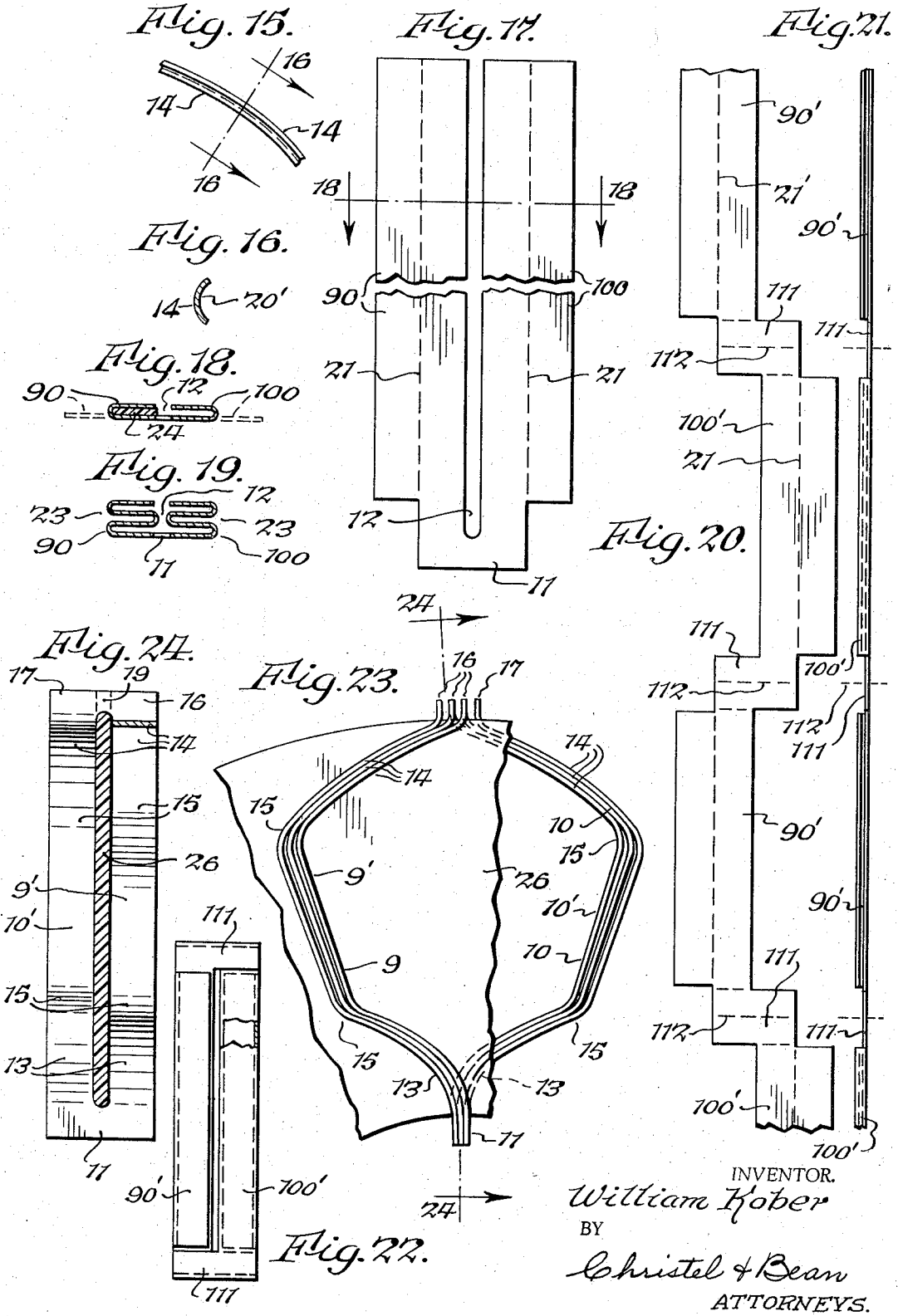

United States Patent Office 3,292,024
Patented Dec. 13, 1966

3,292,024
DYNAMOELECTRIC MACHINE
William Kober, Fairport, N.Y., assignor, by mesne assignments, to The Garrett Corporation, Los Angeles, Calif., a corporation of California
Filed May 16, 1963, Ser. No. 280,973
6 Claims. (Cl. 310—201)

This invention relates generally to the dynamoelectric art, and more specifically to certain new and useful polyphase armature constructions of the axial air gap type.

A primary object of my invention is to provide a winding of this type making a highly efficient use of the space available to produce maximum conductivity.

Another object of my invention is to provide a winding of this type producing a strong mechanical structure, making it particularly suitable, for example, in armatures having no associated ferro-magnetic or other supporting structure.

In one aspect thereof, an axial air gap dynamo armature of my invention is characterized by the provision of an armature winding having a main conductor portion disposed in the flux path across the air gap, and an end conductor portion defining an involute.

In another aspect thereof, an axial air gap dynamo armature of my invention is characterized by the provision of a winding including a coil comprising a slotted strip of electrically conductive material, each leg of the strip being formed to provide a main conductor portion lying in the flux path across the gap and inner and outer end portions, the coil legs being offset in the direction of the axis of rotation of provide the aforesaid conductor portions at two levels.

In another aspect thereof, an axial air gap dynamo armature of my invention is characterized by the provision of an armature winding having spaced main conductor portions disposed in the flux path across the gap, and inner and outer end conductor portions each defining an involute, the involute end conductor portions of adjacent coils nesting and being bonded together.

In still another aspect thereof, an axial air gap dynamo armature of my invention is characterized by the provision of an armature winding comprising a continuous strip of electrically conductive material, the strip being formed to provide a series of alternating first and second conductor portions joined by connecting portions, the first and second conductor portions being offset to provide conductors at two levels, and the connecting portions being folded whereby the strip provides a chain of series connected coils.

The foregoing and other objects, advantages and characterizing features of my invention will become clearly apparent from the ensuing detailed description of certain illustrative embodiments thereof, considered in conjunction with the accompanying drawings showing the same wherein like reference numerals denote like parts throughout the various views and wherein:

FIG. 5 is an elevational view of a strip prior to being formed into the coil of FIG. 6;

FIG. 6 is a front elevational view of a coil of my invention, formed from the strip of FIG. 5;

FIG. 7 is a side elevational view of the coil of FIG. 6;

FIG. 8 is a bottom plan view of the coil of FIG. 6;

FIG. 9 is a view corresponding to that of FIG. 8 but showing a modification;

FIG. 10 is a fragmentary, side elevational view of one form of connection between adjacent coils;

FIGS. 11 and 12 are fragmentary, side elevational and top plan views, respectively, of another form of inter-coil connection;

FIGS. 13 and 14 are fragmentary, side and front elevational views, respectively, of still another form of coil and inter-coil connection;

FIG. 15 is a fragmentary, front elevational view of adjacent end conductors of my invention, showing a modification;

FIG. 16 is a transverse sectional view of a single end conductor, taken about on line 16—16 of FIG. 15;

FIG. 17 is a view corresponding to that of FIG. 5, but showing a modification;

FIG. 18 is a transverse sectional view thereof, taken about on line 18—18 of FIG. 17 after folding;

FIG. 19 is a view like that of FIG. 18, but showing a modification;

FIG. 20 is a view corresponding to those of FIGS. 5 and 17, but showing another modification, parts being broken away for ease of illustration;

FIG. 21 is a side elevational view thereof, after partial folding;

FIG. 22 is a side elevational view thereof after folding into coil form, parts being broken away for greater clarity;

FIG. 23 is a front elevational view of a series of nested coils of my invention; and FIG. 24 is a sectional view thereof, taken about on line 24—24 of FIG. 23.

The principle of two levels, in polyphase windings, is well known. On the upper level, at the top of the shaft, the conductors all nest. A transition is made to the lower level, at the bottom half of the slot, where the conductors again nest. The end conductors usually are substantially straight.

Figure 1:
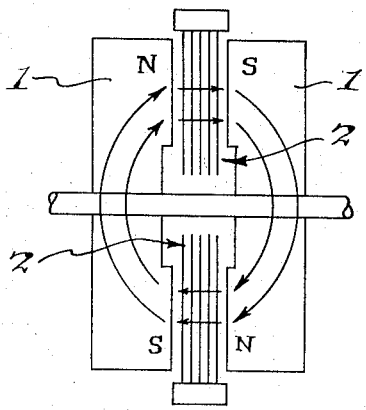
FIG. 1 is a schematic representation of a type of dynamo with which the instant invention is particularly useful.

In the case of axial air gap machines, however, such as shown in FIG. 1 hereof, this known arrangement does not provide the shortest conductor and the closest spacing. This is provided, by my invention, as follows.

FIG. 1 represents a dynamo. Opposed field structures 1 are mounted for rotation relative to an interposed armature structure 2, the field structures preferably having alternating poles with the north pole or poles of one structure being proximate the south pole or poles of the other. The gap between structures is axial, and the flux path is indicated by the arrows.

Figure 2:
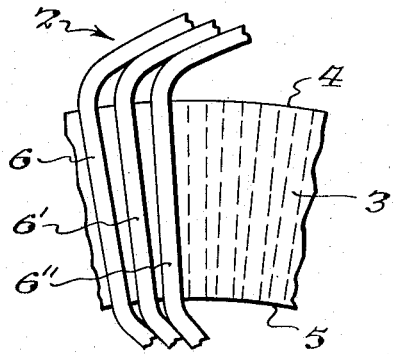
FIG. 2 is a fragmentary, front elevational view of an armature of my invention.

In FIG. 2, representative conductors 6, 6' and 6" are shown mounted in slots of stator iron 3, which has an outer diameter 4 and an inner diameter 5. Stator 3 can be part of armature 2 in FIG. 1. In the case of an armature having no iron, 3 can represent a field structure having outer and inner diameters 4 and 5. After a short transition space to clear the slot iron, the conductors are curved so as to be in contact all along the length of the end conductor region. This gives the shortest conductor and shortest end projection possible. The curve followed by the line between conductors 6 and 6', for example, is such that the same curve angularly displaced by one slot pitch, to the line between conductors 6' and 6", for example, will be equidistant from it at all points. This equal distance is the width of the conductor. Such a curve represents the proper form of the conductor, and will hold true in the region outside diameter 4 as well as inside diameter 5. The necessary curve will now be investigated and defined.

Figure 3:
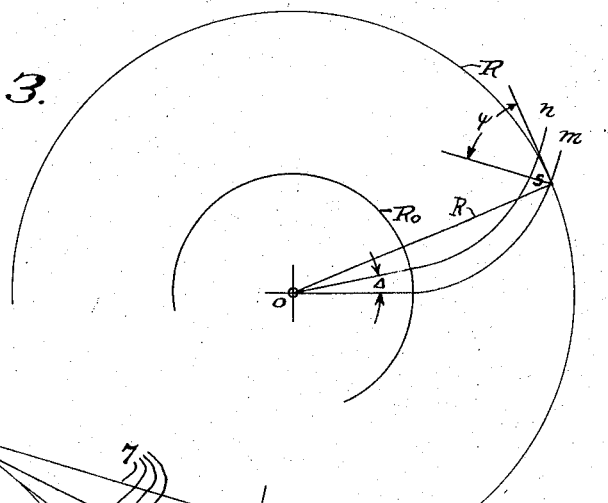
FIGS. 3 and 4 are diagrammatic views illustrating the derivation of the end conductor curvature of FIG. 2.

Referring to FIG. 3, what is needed for the shape of an end conductor element is that its curve $m$, displaced through an angle $\Delta$ by rotation about the center to curve $n$, should be equidistant at all points from curve $m$. There is obviously a circle $R_o$ at which the distance S between curves $n$, $m$, is circumferential, so that if there are P curves in 360°, $2\pi R_o/P = S$. At any other distance R from the center O, the distance between curves is measured by the normal S to curve $m$, which makes an angle $\psi$ with the normal S to curve $m$, tangent to R at the intersection of R and $m$.

Then, at R $$2 R/P \cos \psi = S \quad (1)$$

From these equations, $$R/R_o \cos \psi = 1 \quad (2)$$

and if $R/R_o$ is written as $r$, $$r \cos \psi = 1 \quad (3)$$

Figure 4:
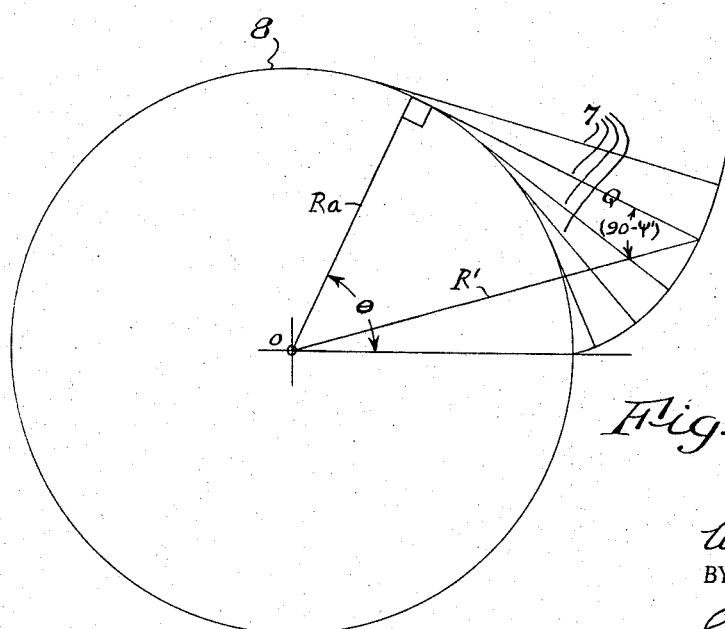

There is a curve with this required property, called an involute curve. This curve is produced by unwinding a string from a circular perimeter as shown in FIG. 4. The point of beginning contact of the string 7 and the cylinder 8 is a tangent to the cylinder, and is at right angles to the radius $R_a$ at that point.

It is readily seen that the angle between the lines marked R' and Q is $(90° - \psi')$ as defined above, and that if $r' = R'/Ra$ $$Ra/R' = \sin (90 - \psi') \quad (4)$$
$$r' \sin (90 - \psi') = 1 \quad (5)$$

Thus the involute has the required property for equidistance. If the unwrapping string of the involute has points marked on it, equally spaced apart a distance S, each point describes an involute, and the series of curves so drawn are all equidistant.

My invention provides axial air gap windings, and an entirely different way of forming coil sides of shapes that will nest in the manner described above. In one form, shown in FIGS. 5–8, a strip of copper (or other good electrical conductor) sheet of proper size to form the desired coil is slotted down the middle as shown at 12. A part 11 is left solid at the bottom of the strip. The strip is then bent into coil shape with side 9 on the upper level and side 10 on the lower level, as shown. Here, starting at the bottom of slot 12, shown at BB in FIG. 6, inner end conductor portions 13 are involutes and will nest in substantial contact with the corresponding parts of adjacent coils. Involutes 13 continue up to transition bends 15, which join the inner end conductor portions to substantially radial, straight sections 9', 10', comprising the main conductor portions extending through the flux path across the air gap. These main conductor portions are joined by further transition bends 15 to outer end conductor portions 14, which also are involutes and will nest with the corresponding parts of adjacent coils. The outer ends of coil sides 9, 10 terminate in upturns 16, 17 for splicing to the next coil or connection.

Each coil thus formed will be in substantial contact with the adjacent coils along involutes 13 and 14, but will be spaced away therefrom at bends 15 and radial parts 9', 10'. This is particularly advantageous where no armature iron is used, because it provides for air cooling where it is most needed, while retaining the desired end conductor compactness. The main conductor portions 9' and 10' need not be straight, but can comprise a single bend from 13 to 14, of large or small radius.

In some cases, the space above described between conductors can be filled with a magnetically permeable medium, such as iron or ferrite dust in a suitable vehicle, to bond in place.

In choosing an involute form, it is usually not taken at a starting radius as small as $R_o$ (FIG. 4), because at first all the length is nearly radial and does not produce progress in closing the end circuit. Thus, there is usually a transition bend at the bottom of the slot 12 (B—B, FIG. 6), between connecting end 11 and the involute portions 13. Consequently, all of end 11 is normally spaced from its adjacent nesting element, and not in contact therewith as are the regions of involute form. This has the useful property of making the stacking at the bottom of portion 11 non-interfering with the desired involute stacking. In fact, the full thickness of the strip will not interfere at the bottom edge of portion 11 if $R - R_o$ is more than the distance from the bottom of the strip to the bottom of the slot 12. Instead of leaving the bottom of the strip vertical to the plane of the paper in FIG. 6, as shown in FIG. 8, it may be tilted or canted, as shown in FIG. 9 to shorten the end conductor length. However, the slope of the tilt can be no more than the slope of the involute at the corresponding value of R, or this region will force the nesting involutes at 13 out of contact.

At points 16, 17 the strip is shown turned up or out, to make a convenient splicing point for joining the coil shown to the next coil or to the coil group system. There is a good deal of room at this radius from the winding center, for example O in FIG. 4, and the next adjacent coil is spaced well enough away to permit many choices of splicing techniques.

As shown in FIG. 10, the part 16 of one coil confronts the part 17 of the adjacent coil with the same spacing or slot width 18 as was used in slot 12. They may be joined by a copper weld or braze, or reinforced solder bridge 19, as shown in FIG. 10. Another good means is to take a folded connector 20 and press, solder, weld or spot-weld it to coil parts 16, 17' as in FIGS. 11 and 12.

In some cases, it is preferred not to turn up parts 16, 17, in which case a rather small joint 19' can be provided as shown in FIGS. 13 and 14 in the area where parts 16' and 17' cross.

The above description has been made mainly with an iron stator of the axial air gap type in mind. However, the coils of the invention are even better suited to generators using no stator iron at all. In this case, the nesting contact between adjacent coils along the involute areas 13 and 14 is an excellent basis for a cement bond therebetween, making the complete stator a mechanically sound unit without need for further strength. In fact, the mere nesting of these coil portions (see FIGS. 2, 15 and 23) in contact supplies a basic form of some mechanical integrity. This feature can be enhanced by transversely curving the strip, particularly in the involute areas 13 and 14, as shown at 20' in FIG. 16. A more complex ribbed shape for this curve may be required in large sizes.

Of course, for such use, the coils must be provided with surface insulation to prevent contact with adjacent elements. Such insulation is normally provided as a safety factor, in other applications, as well.

The use of this strip coil form in the iron-less armature also is particularly advantageous because the thin dimension of the conductor is always parallel to the magnetic flux lines of the field, producing a minimum of eddy current loss.

When the otherwise desirable thickness of the conductor is too great, from the point of view of the above eddy current requirements, the conductor strip is made wider and folded upon itself. Such a strip is shown in FIGS. 17 and 18, wherein sides 90 and 100 are slightly more than twice as wide as sides 9 and 10 of FIG. 5, and then folded on themselves along lines 21 as shown at 22. The areas 25 may be omitted, as they contribute little to conductivity, and the strip sides may be triple folded, or more, as shown at 23 in FIG. 19, if indicated by thickness requirements. Of course, the strip must be surface insulated all over. On the adjacent parts of the folds, this insulation may be replaced or supplemented by pinching paper strips in the folds, as shown at 24. Any other film of suitable type may be used in place of paper.

In accordance with another aspect of my invention, the armature winding can be produced from a continuous conducting strip formed to produce a chain of nesting, series connected coils without splices. The pattern to which the strip is cut is shown in FIG. 20, comprising a series of alternating, laterally offset and spaced upper and lower coil parts 90', 100' joined by connector portions 111. When folded about lines 21' (as in FIG. 21) and then formed by folding about lines 112, the result resembles FIG. 17, but with joining areas at the top and bottom, as shown in FIG. 22.

When a full set of coils is built up to 360°, there is a circular disc of space 18, see FIGS. 10, 11, 12 and 13, between the upper level sides 9 and the lower level sides 10, which space is of the width of slot 12. An insulating sheet 26 (FIGS. 23 and 24) cut into a ring, can be placed in this area to improve the insulation between the passing inner edges of side parts 9 and 10. This sheet may be made rather thick, though at the expense of useful copper as the slot 12 would be widened accordingly, but can then add materially to the mechanical strength of the structure. Ring 26 can be solid, or split, and can comprise multiple parts.

The coils can be combined into phase groups, and phase groups into the desired polyphase terminals, in a manner known in the art, and the completed armature can be supported in place between the field structures.

Accordingly, it is seen that my invention fully accomplishes its intended objects.

Having fully disclosed and completely described my invention and its mode of operation, what I claim as new is:

1. In a dynamoelectric machine having field structures spaced apart along the axis of the machine and producing flux across an annular axial air gap and having an armature structure supported within said air gap and centered about said axis, and said field and armature structures being rotatable relative to each other about the axis; the armature structure comprising:
    (a) a disc of winding-supporting material centered about said axis and normal thereto in a plane occupying said air gap, the diameter of the disc being great as compared with its thickness; and
    (b) armature windings supported on the disc and comprising conductive substantially-rigid sheet-material strips including pairs of main conducting members having portions disposed generally radially of the axis and these portions having larger-area faces standing substantially normal to the surface of the supporting disc, and the main conducting portions being joined together at their first ends by integral connecting members disposed generally axially of the machine, the paired main conducting members straddling the disc and being joined at their second ends to the main conducting members of other paired members.

2. In a dynamoelectric machine having field structures spaced apart along the axis of the machine and producing flux across an annular axial air gap and having an armature structure supported within said air gap and centered about said axis, and said field and armature structures being rotatable relative to each other about the axis; the armature structure comprising:
    (a) a disc of winding-supporting material centered about said axis and normal thereto in a plane occupying said air gap, the diameter of the disc being great as compared with its thickness;
    (b) armature windings supported on the disc and comprising conductive sheet-material strips including pairs of main conducting members having portions disposed generally radially of the axis and joined together at their first ends by integral connecting members disposed generally axially of the machine, the paired main conducting members straddling the disc and being joined at their second ends to the main conducting members of other paired members; and
    (c) the main-conducting portions of said strips which are disposed generally radially of said axis each standing substantially normal to the surface of the supporting disc and comprising plural conductors mutually joined together along their radially extending edges and disposed in mutually parallel spaced relationship to provide laminar conducting means having reduced eddy current loss characteristics.

3. In a dynamoelectric machine having field structures spaced apart along the axis of the machine and producing flux across an annular axial air gap and having an armature structure supported within said air gap and centered about said axis, and said field and armature structures being rotatable relative to each other about the axis; the armature structure comprising:
    (a) a disc of winding-supporting material centered about said axis and normal thereto in a plane occupying said air gap, the diameter of the disc being great as compared with its thickness;
    (b) armature windings supported on the disc and comprising conductive sheet-material strips including pairs of main conducting members having portions disposed generally radially of the axis and joined together at their first ends by integral connecting members disposed generally axially of the machine, the paired main conducting members straddling the disc and being joined at their second ends to the main conducting members of other paired members; and
    (c) the disc having a central opening therethrough and the armature having inner connecting members extending through the opening and joining main conducting members on opposite sides of the disc and the armature having outer connecting members extending around the outer periphery of the disc and joining other connecting members, and all of the connecting members extending from their midpoints toward the respective main conducting members along involute-shaped curves; and the connecting members being respectively nested together and bonded in mutually insulated relationship to form a stable structure.

4. In a dynamoelectric machine having field structures spaced apart along the axis of the machine and producing flux across an annular axial air gap and having an armature structure supported within said air gap and centered about said axis, and said field and armature structures being rotatable relative to each other about the axis; the armature structure comprising:
    (a) a disc of winding-supporting material centered about said axis and normal thereto in a plane occupying said air gap, the diameter of the disc being great as compared with its thickness;
    (b) armature windings supported on the disc and comprising conductive sheet-material strips including pairs of main conducting members having portions disposed generally radially of the axis and joined together at their first ends by integral connecting members disposed generally axially of the machine, the paired main conducting members straddling the disc and being joined at their second ends to the main conducting members of other paired members; and
    (c) said armature structure including a one-piece zigzag conductive strip having equally spaced transversely disposed connecting portions joining alternate mutually-offset first and second longitudinal main-conducting portions which are respectively coupled to opposite ends of the connecting portions, the connecting portions each being folded back upon itself about a transverse line, and the strip thus folded being disposed about said disc such that the respective first and second main-conducting portions straddle the disc alternately on opposite sides thereof, the adjacent portions of the strip being nested together in closely spaced relationship to form armature windings.

5. In a dynamoelectric machine having field structures spaced apart along the axis of the machine and producing flux across an annular axial air gap and having an armature structure supported within said air gap and centered about said axis, and said field and armature structures being rotatable relative to each other about the axis; the armature structure comprising:

(a) a disc of winding-supporting material centered about said axis and normal thereto in a plane occupying said air gap, the diameter of the disc being great as compared with its thickness;

(b) armature windings supported on the disc and comprising conductive sheet-material strips including pairs of main conducting members having portions disposed generally radially of the axis and joined together at their first ends by integral connecting members disposed generally axially of the machine, the paired main conducting members straddling the disc and being joined at their second ends to the main conducting members of other paired members; and (c) the paired main-conducting members being staggered circumferentially of the disc into different axial planes, and the connecting members joining the outer ends of each pair of members being radially disposed midway between said ends and extending therefrom toward the conducting members along involute-shaped curves.

6. In a dynamoelectric machine as set forth in claim 5, the inner ends of the main conducting members being differently paired and joined together by other connecting members which are radially disposed midway between the main conducting members and extend therefrom toward the main conducting members along involute-shaped curves.

References Cited by the Examiner

UNITED STATES PATENTS

| | | | |
|---|---|---|---|
| 376,307 | 1/1888 | Jehl | 310—268 |
| 534,953 | 2/1895 | Eickemeyer | 310—268 |
| 559,692 | 5/1896 | Fiske et al. | 310—270 |
| 1,775,634 | 9/1930 | Apple | 310—201 |
| 1,849,215 | 3/1932 | Apple | 310—201 |
| 2,361,842 | 10/1944 | Heintz et al. | 310—201 |
| 2,993,135 | 7/1961 | Henry-Baudot | 310—268 |
| 3,056,058 | 9/1962 | Henry-Baudot | 310—268 |

FOREIGN PATENTS 311,343 9/1933 Italy.

MILTON O. HIRSHFIELD, *Primary Examiner.*

ORIS L. RADER, *Examiner.*

D. F. DUGGAN, *Assistant Examiner.*